(12) United States Patent
Bailey

(10) Patent No.: US 7,559,420 B2
(45) Date of Patent: Jul. 14, 2009

(54) WOOD CHIP FLINGER AND METHOD

(75) Inventor: Kenneth F. Bailey, Apex, NC (US)

(73) Assignee: Bailey Consulting, Inc., Apex, NC (US)

( * ) Notice: Subject to any disclaimer, the term of this patent is extended or adjusted under 35 U.S.C. 154(b) by 410 days.

(21) Appl. No.: 11/563,445

(22) Filed: Nov. 27, 2006

(65) Prior Publication Data

US 2008/0121308 A1    May 29, 2008

(51) Int. Cl.
*B65G 31/04* (2006.01)

(52) U.S. Cl. ............... 198/642; 414/301; 141/286

(58) Field of Classification Search ........... 198/642; 414/301; 239/681; 141/286
See application file for complete search history.

(56) References Cited

U.S. PATENT DOCUMENTS

| | | | |
|---|---|---|---|
| 0,627,906 | A | 6/1899 | Cowles et al. |
| 1,300,800 | A | 4/1919 | Wood |
| 1,457,113 | A | 5/1923 | Landworthy |
| 1,691,683 | A | 11/1928 | Townsend |
| 2,239,448 | A | 4/1941 | Selhorst |
| 2,788,115 | A | 4/1957 | Friedman |
| 2,834,483 | A | 5/1958 | Friedman |
| 2,845,190 | A | 7/1958 | Creuzburg |
| 2,970,782 | A | 2/1961 | Fleissner |
| 3,191,783 | A | 6/1965 | Henderson |
| 3,195,711 | A | 7/1965 | Bogdan et al. |
| 3,369,647 | A * | 2/1968 | Van Der Lely ........ 198/642 |
| 3,643,819 | A | 2/1972 | Halcomb |
| 3,885,665 | A * | 5/1975 | Fisher ........ 198/665 |
| 4,479,428 | A | 10/1984 | Krueger et al. |
| 4,820,108 | A | 4/1989 | Kneer |
| 4,968,211 | A * | 11/1990 | Compton ........ 414/502 |
| 5,163,624 | A * | 11/1992 | Schwartzbach ........ 239/679 |
| 5,184,714 | A | 2/1993 | Tapp |
| 5,316,429 | A | 5/1994 | Connelly et al. |
| 5,348,434 | A | 9/1994 | Peeples et al. |
| 5,393,189 | A | 2/1995 | Berquist |
| 5,735,319 | A | 4/1998 | McNamara et al. |
| 6,109,312 | A | 8/2000 | Sawyer et al. |
| 6,213,289 | B1 | 4/2001 | Hay et al. |
| 6,811,020 | B2 | 11/2004 | Bailey |

(Continued)

FOREIGN PATENT DOCUMENTS

GB    2173682    10/1986

*Primary Examiner*—Mark A Deuble
(74) *Attorney, Agent, or Firm*—Coats & Bennett, P.L.L.C.

(57) ABSTRACT

An assembly for processing wood chips with a novel blade profile allows wood chips to be packed great density. The profile may be a stepped profile with a plurality sections forming a rotationally forward face. Neighboring sections are non-collinear and at least one of the sections is parallel to a rotational axis. The profile may include a generally centrally disposed first section of $\geq \frac{1}{4}$ of a relevant dimension; a third section of $\geq \frac{1}{8}$ of the relevant dimension; a second section disposed between the first section and a third section and non-collinear with the third section; with the sections disposed relative to the rotational axis in advantageous positions. The profile may be such that second and third sections of the blade have approximately equal longitudinal extents, but the tilt-angle-weighted surface area of the second section is substantially less than the third tilt-angle-weighted surface area of the third section.

24 Claims, 9 Drawing Sheets

U.S. PATENT DOCUMENTS

| | | |
|---|---|---|
| 6,948,610 B2 | 9/2005 | Connor et al. |
| 2002/0076308 A1 | 6/2002 | Bailey et al. |
| 2004/0045629 A1 | 3/2004 | Bailey |
| 2004/0065386 A1 | 4/2004 | Bailey |

* cited by examiner

US 7,559,420 B2

WOOD CHIP FLINGER AND METHOD

BACKGROUND OF THE INVENTION

The present invention relates generally to the field of wood chip processing, and more particularly to a machine and associated method for dense packing of wood chips for storage, transport, or further processing.

One major factor in the cost of wood chips for paper making is the cost of transporting the wood chips from the chip manufacturing site to the paper mill. The wood chips are typically transported in rail cars, but may also be transported in barges, trailers, or the like. Typically, the transportation costs are based primarily on the number of containers used to ship a given load of wood chips. Thus, the more densely containers can be packed, the lower the transportation costs for delivering a given amount of useable wood chips.

Space considerations are also relevant in the storage and processing of wood chips. For instance, the storage of wood chips on site, such as at a pulp mill, consumes space. As such, it is advantageous to have the wood chips densely packed when "stacking" the wood chips for storage.

While a number of wood chip handling techniques have been proposed in the industry, there remains a need for alternative wood chip handling techniques, particularly ones that allow for dense packing of the wood chips for storage and/or transport.

SUMMARY OF THE INVENTION

The present invention provides an assembly for processing wood chips with a novel blade profile and related methods. In one embodiment, the blade profile is a stepped blade profile with a plurality sections forming a rotationally forward face, with neighboring sections being non-collinear and at least one of the sections being parallel to the axis. In another embodiment, the blade profile includes first, second, and third sections; the first section being generally centrally disposed and having a longitudinal extent that is at least ¼ of a relevant dimension; the second section disposed between the first section and the third section and non-collinear with the third section; the third section having a longitudinal extent that is at least ⅛ of the relevant dimension; with the sections disposed relative to the axis in advantageous positions. In yet another embodiment, the blade profile is such that second and third sections of the blade having approximately equal longitudinal extents relative to the axis, but the tilt-angle-weighted surface area of the second section is substantially less than the third tilt-angle-weighted surface area of the third section. The assembly advantageously allows wood chips to be packed with a density greater than that achieved using conventional free-fall techniques, such as at ≧20% more than that achieved with the conventional free-fall techniques.

More particularly with respect to one embodiment, the present invention provides an assembly for processing wood chips, comprising: a drum disposed so as to rotate about a generally horizontal longitudinal axis, the drum comprising a central core and at least first and second blades extending outwardly from the core and circumferentially spaced from one another; the drum having a longitudinal length; a motor operatively connected to the drum and supplying rotational power thereto; the first blade having a stepped blade profile with a plurality sections forming a rotationally forward face, with neighboring sections being non-collinear and at least one of the sections being parallel to the axis. The second blade may have a blade profile similar to the blade profile of the first blade and the blades may each extend substantially across the width of the drum. At least two of the sections may be parallel and the blade profile may vary discontinuously in blade axial tilt angle.

Other aspects of the assembly and related methods are also evident from the following description and corresponding drawings.

DESCRIPTION OF THE PREFERRED EMBODIMENTS

Figure 1:
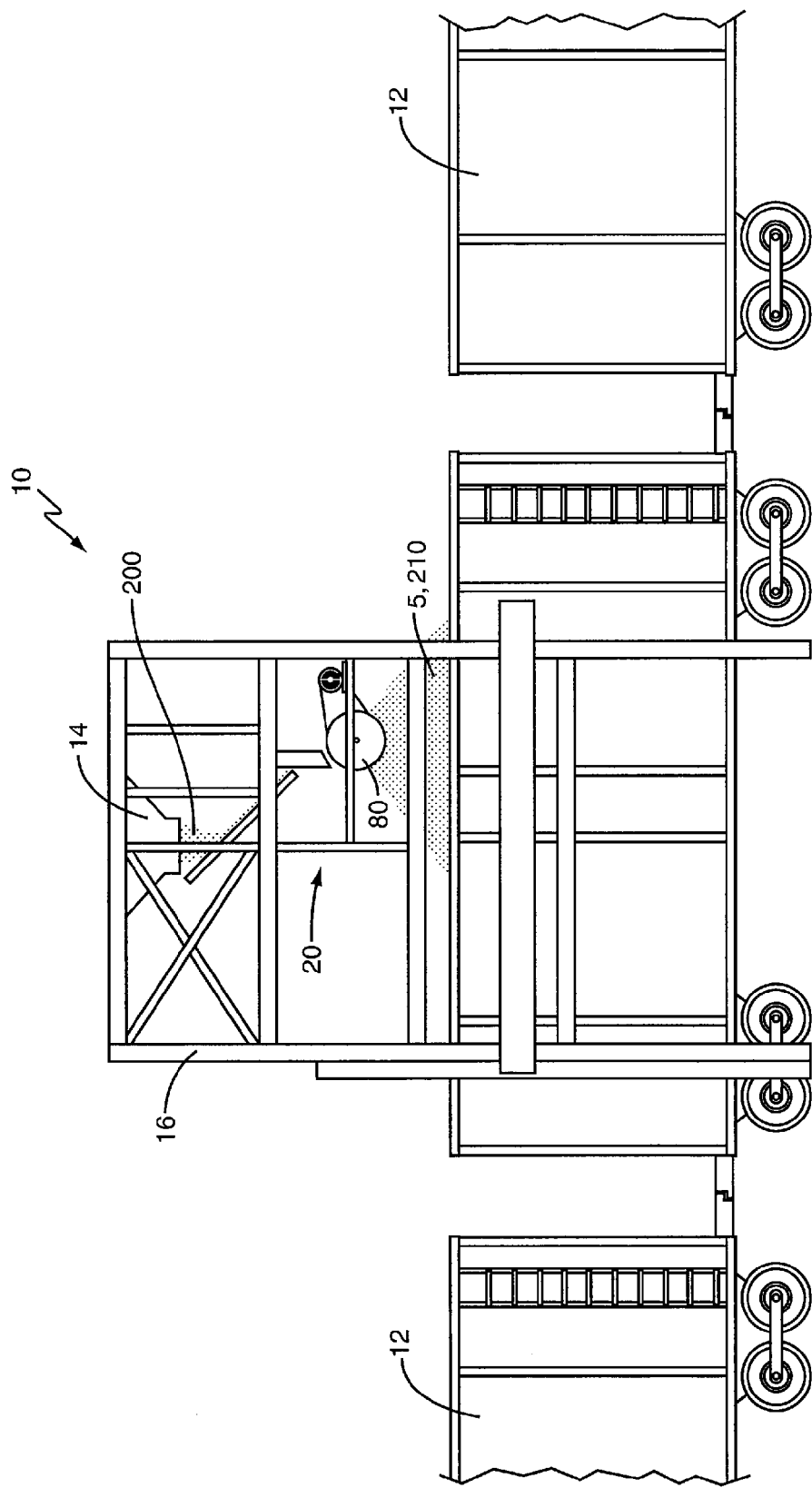
FIG. 1 shows one embodiment of the device of the present invention employed in a wood chip loading station for filling railcars.

In order to provide a better understanding of the present invention, one embodiment of the wood chip handling device according to the present invention is shown in FIG. 1 in the context of a wood chip loading station 10 for filling railcars 12. The wood chip handling device, generally indicated at 20, is shown installed in a tower structure 16 that extends above a rail line with a railcar 12 thereon. Wood chips 5 are fed to the handling device 20 in the tower 16 by any suitable means, such as by conventional conveyor system 14 (only the output funnel of which is shown for clarity), or alternatively via a pneumatic means into a cyclone, or by other like means known in the art. While the input feed system (e.g., conveyor system 14) is shown with only one output, it should be understood that the input feed system may have multiple outputs, such as in a so-called "pants leg" bifurcated chute system known in the art. There may be a handling device 20 at each output, or at only one output, as is desired. The handling device 20 takes the input stream of wood chips from the conveyor 14 and directs it into the railcar 12 so that the wood chips 5 are packed in railcar 12. In most applications, the railcar 12 will be moved underneath the handling device 20 during the loading process so as to fill the entirety of the railcar's length, but the device 20 (with or without the tower 16) may alternatively be moved while the railcar 12 is held stationary, if desired.

One embodiment of the handling device 20, sometimes referred to herein as the "flinger," includes a frame 22, a motor 24, a feed chute assembly 30, and a drum 80. See FIG. 2. The frame 22 supports the motor 24, feed chute assembly 30, and drum 80, and may take any suitable form known in the art, such as welded assembly of angle iron. The motor 24 supplies rotational power to the drum 80, typically via a pulley and belt arrangement (not shown in detail). The motor 24 may be of any type known in the art, but is typically an electric motor of approximately fifteen horsepower or more.

Figure 3:
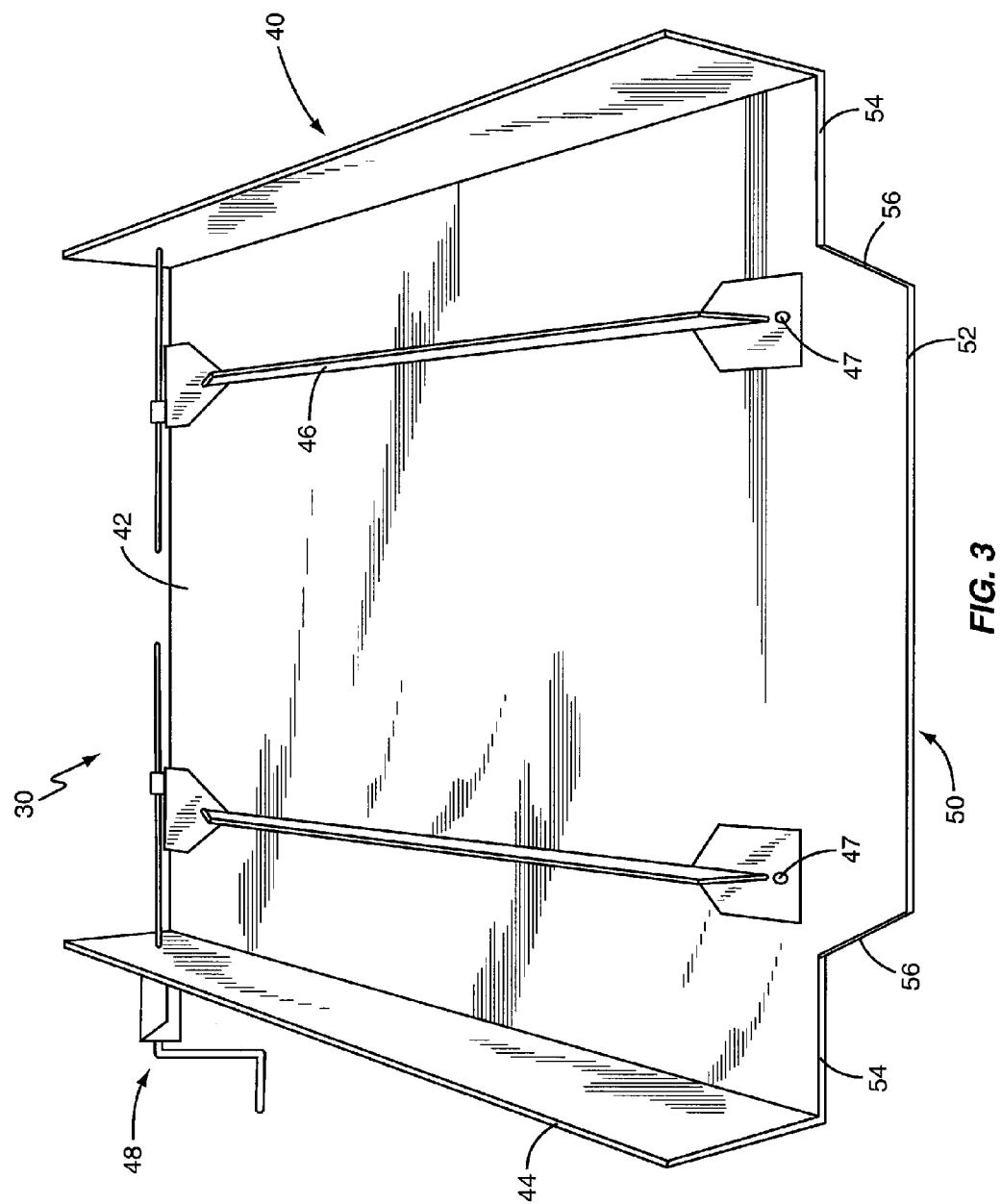
FIG. 3 shows a perspective view of a baseplate assembly.
Figure 4:
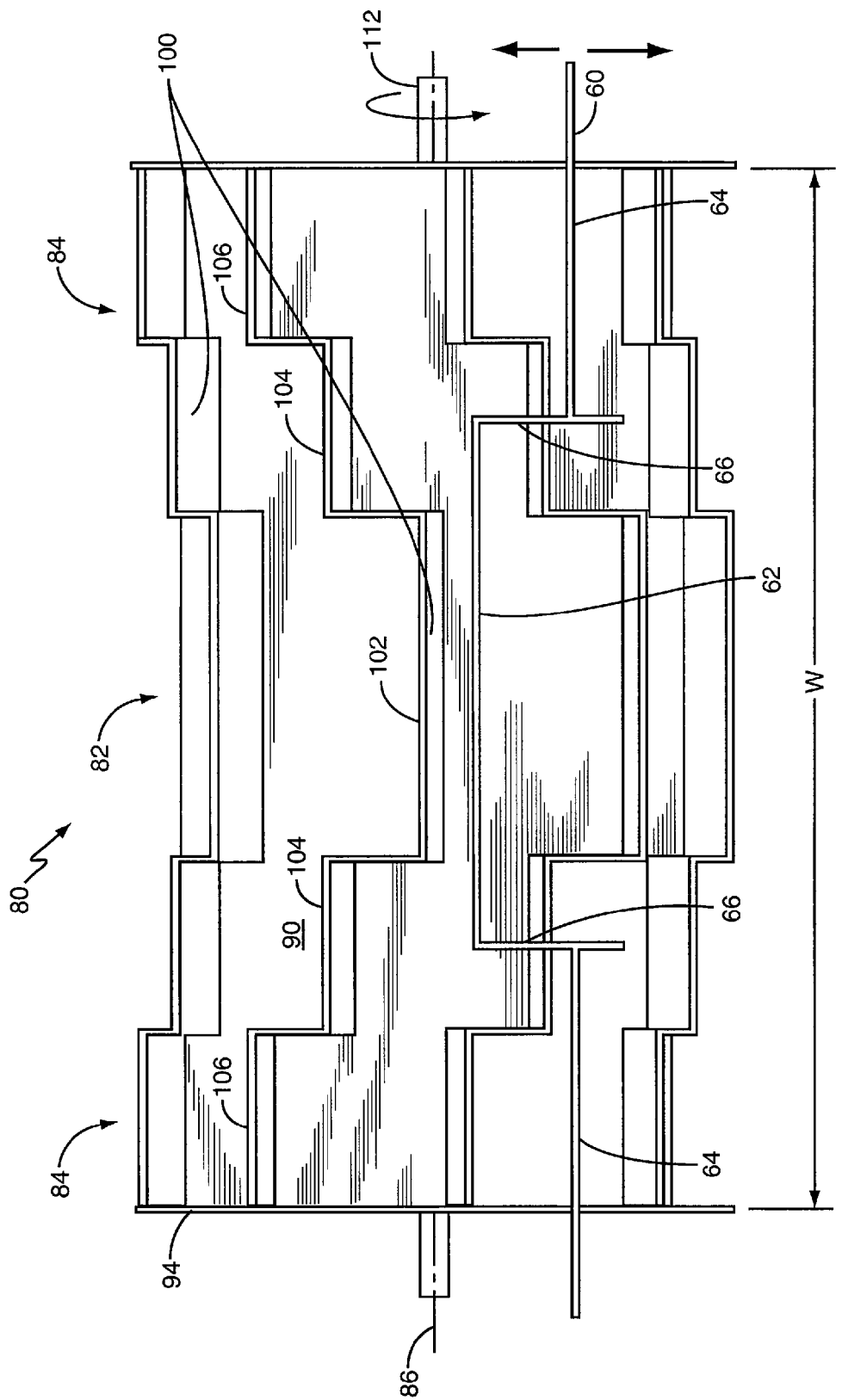
FIG. 4 shows a simplified top view of the drum and directing wall of one embodiment.

Disposed above the drum 80, and between the drum 80 and the conveyor system 14, is a feed chute assembly 30. Referring to FIGS. 3-4, the feed chute assembly 30 includes a sloped baseplate assembly 40 and an optional deadwall 60 towards the output end 50 thereof. The baseplate assembly 40 of a preferred embodiment includes a baseplate 42 and dividers 46. The baseplate 42 is a sturdy, substantially rectangular plate with side flanges 44. The baseplate 42 is disposed in a tilted orientation, so that the input end is higher than the output end 50. The output end 50 preferably has a stepped profile, with a center section 52 flanked by respective side sections 54, and corresponding transition sections 56. The center and side sections 52,54 are preferably straight and parallel to one another, with the center section 52 ending later than the side sections 54. The transition sections 56 provide a transition between the center section 52 and the side sections 54. In a preferred embodiment, the overall appearance of the output end 50 of the baseplate 42 is that of a trapezoid tongue as shown in FIG. 4, but this is not required. It should be noted that the baseplate assembly 42 may be oriented so as to feed chips from the input end to the output end in a direction that is either forward or backward relative to the direction of rotation of drum 80, as needed or required by installation circumstances.

Two dividers 46 may be moveably attached to the baseplate 42 so as to be selectively positioned by pivoting about corresponding pivot points 47 (e.g., shouldered bolts extending through the baseplate 42). The location of the upper ends of the dividers 46 may be adjusted with respect to the baseplate 42 using a suitable adjusting mechanism 48. By way of non-limiting example, the adjusting mechanism 48 may take the form of a crank and threaded rod arrangement, with suitable pivoting connections between the tops of the dividers 46 and the threaded rods. Of course, other means known in the art may be used to control the position of the upper ends of the dividers 46. Whatever means is selected, it will be advantageous to position the controls thereof (e.g., the crank) so as to allow easy access thereto by a user during operation of the handling device 20. The purpose of the dividers 46 is to control the flow ratio of the wood chips flowing down the baseplate assembly 40 to the center 82 and side portions 84 of drum 80.

The directing wall, or deadwall, 60 is a generally vertical wall that acts to focus the flow of the wood chips flowing down the baseplate assembly 40 generally vertically onto the drum 80. As shown in FIG. 4, the directing wall 60 may include a center section 62, flanking side sections 64, and appropriate offset sections 66 therebetween. The center and side sections 62,64 are preferably straight and parallel to one another, and preferably are disposed a height from the center of drum 80. The offset sections 66 are preferably generally perpendicular to the center and side sections 62,64 and are likewise disposed at a height from drum 80. Thus, the directing wall 60, when viewed from above, preferably has the shape shown in FIG. 4. It should be noted that the offset sections 66 may simply connect the center and side sections 62,64; or, alternatively, the offset sections 66 may be longer such that they extend toward the feed chute baseplate assembly 40 to a point beyond the intersection with the side sections 64 as shown in FIG. 4. This optional "extra" length for the offset sections 66 is believed to aid in achieving the desired side-to-side balance of wood chips being supplied to the drum 80. Further, the directing wall 60 should be located, and be of sufficient height, so that the wood chips from the baseplate 42 impact in the vertical middle of the directing wall 60. The bottom of the directing wall 60 should be relatively close to the drum 80, with a clearance therebetween of ½ to three inches believed advantageous when the baseplate assembly 40 is disposed on the drum's rotationally downstream side of the directing wall 60. In addition, the side profile of the bottom of the directing wall 60 may be angled or curved to follow the contour of the drum 80 if desired.

The directing wall 60 is located forward of the output end 50 of the baseplate assembly 40, so that a substantial gap is formed therebetween to allow passage of the wood chips without jamming as the wood chips change flow direction. Further, while the directing wall 60 may be located prior to top dead center (behind the rotation axis 86 of the drum 80), the directing wall is advantageously located at a position that is beyond top dead center of the drum 80 (see FIGS. 2 and 4). The center section 62 of the directing wall 60 may be narrower than the center section 52 of baseplate 42 by about an inch, with the transition sections 56 of the baseplate 42 extending laterally approximately another two inches. Of course, the gap size is at least partially governed by the spacing between the output end of the baseplate assembly 40 and the location of the directing wall 60. The position of the directing wall 60 relative to the baseplate 42 and/or drum 80 may be permanently fixed; however, the position of the directing wall 60 may be adjustable (for instance, ±3 inches) in some embodiments of the present invention, such as by mounting the directing wall 60 using bolts, with multiple bolt holes provided in the frame 22. It may be advantageous to vary the gap size, nominally ten to twelve inches, in proportion to the desired output rate of the device 20.

While the space above the baseplate 42 of the feed chute assembly 30 may be open, the feed chute assembly 30 may optionally include a cover (not shown) spaced from the baseplate 42 to help contain any errant wood chips. The optional cover may extend above the top of the directing wall 60, and be spaced therefrom, so as to provide an overflow route, if desired.

Figure 5:
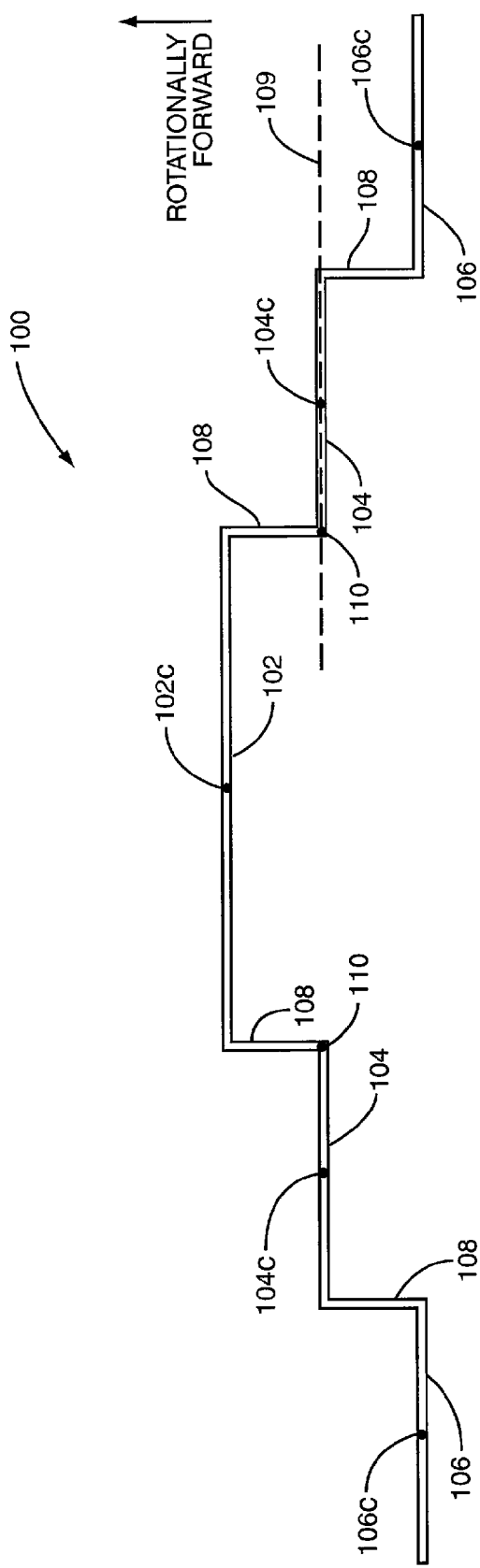
FIG. 5 shows a top (radial) view of a blade profile of the drum of FIG. 4.

The drum 80 is mounted for rotation about a generally horizontal axis 86, and supported by the frame 22. The drum 80 may be mounted to an axle 112, which may be a central shaft or a pair of stub shafts, which is in turn supported by suitable bearings mounted to the frame 22. As indicated above, the axle 112 should have a pulley, gear, or like means for accepting non-gravitational rotational power to turn the drum 80, such as from motor 24. The drum 80 includes a main body core 90 with a plurality of outwardly extending blades 100, and preferably a pair of lateral endcaps 94. The main body 90 of the drum 80 may have a circular cross-section, but preferably has a faceted cross-section, such as an octagonal cross-section as shown in FIG. 5. The blades 100 are mounted to the core 90 so as to extend away from the surface thereof; for instance, the blades 100 may extend generally perpendicular from the corresponding facet 92 forming the perimeter of the drum's core 90. The blades 100 should preferably extend from one lateral endcap 94 to the other.

Each blade 100 may have an approximately uniform height, and the blades 100 are preferably substantially identical, but neither aspect is strictly required for all embodiments. Each blade 100 is formed by a plurality of sections: a center section 102, respective end sections 106, and intermediate sections 104. For the embodiment shown in FIGS. 4-6, these sections are all generally straight and parallel to each other. Further, for the embodiments of FIGS. 4-6, the center section 102 is disposed rotationally forward, proximate forward facet joint 92a of facet 92; end sections 106 are disposed rotationally rearward, proximate rear facet joint 92c of facet; and intermediate sections 104 are disposed therebetween, approximately in the middle of facet 92. The center section 102 is disposed in a centered position with respect to the longitudinal width W of drum 80. The center section 102 typically has a longitudinal extent (i.e., in the direction of axis 86) of approximately ¼ to ½ the width W of drum 80. The intermediate sections 104 are disposed longitudinally outboard of the center section 102, at a position that is slightly rotationally retarded with respect to the center section 102. Each intermediate section 104 may have a longitudinal extent of at least ⅛ the width W of drum 80, and advantageously approximately ⅙ of width W. The intermediate sections 104 may be joined to the center section 102 by corresponding offset sections 108 that run generally perpendicular to axis 86. The end sections 106 are disposed outboard of their respective intermediate sections 104, at a position that is slightly rotationally retarded with respect to the corresponding intermediate section 104. The end sections 106 may have a longitudinal extent of at least ⅛ the width W of drum 80, and advantageously approximately ⅙ the width W. The end sections 106 may be joined to their respective intermediate sections 104 by additional offset sections 108. When viewed from a forward direction, the combination of the sections 102,104,106 appears to be gapless in the longitudinal direction (direction parallel to axis 86). When viewed from a radial direction (normal to the facet 92), it can be easily seen that the intermediate section 104 is disposed between the center section 102 and the corresponding end section 106, both rotationally and longitudinally.

Figure 6:
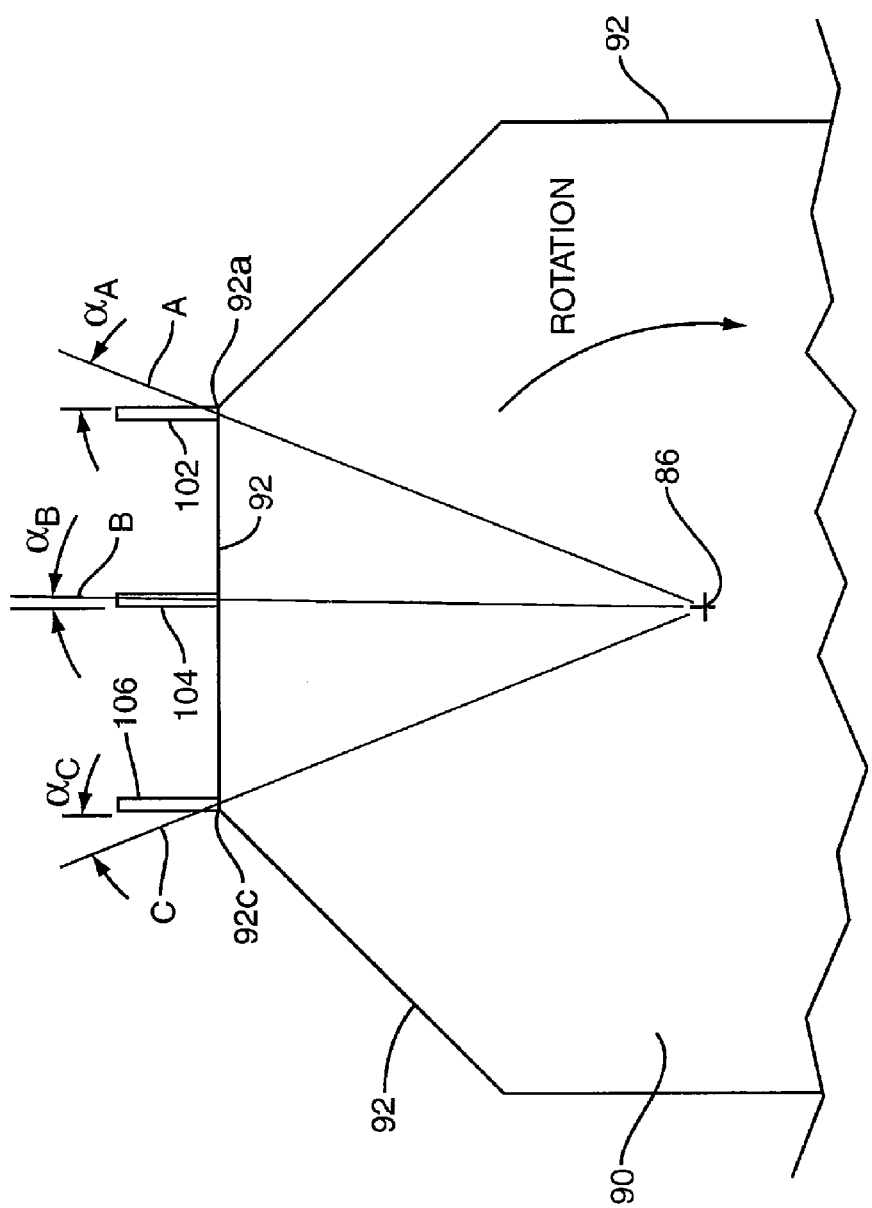
FIG. 6 shows a side view, perpendicular to the rotational axis, of a drum (with endcaps removed for clarity) with a blade having the blade profile of FIG. 5 (with joining sections removed for clarity).

The blade sections 102,104,106 for the embodiment of FIG. 5 are generally straight and flat and disposed so as to extend outwardly generally perpendicular from the corresponding facet 92 forming the perimeter of the drum's core 90. As can be seen in FIG. 6, this arrangement results in the plane of the blade sections 102,104,106 intersecting a theoretical radial plane from axis to where the respective section mounts to facet 92 (i.e., the base of the section) at an angle α. Because this angle α represents the relative tilt of the section relative to a radial projection, this angle α is referred to as the "tilt angle" or "axial tilt angle" of the blade section. With reference to the cross-sectional view taken perpendicular to axis shown in FIG. 6, line A extends from axis 86 to the centerpoint 102c of center section 102, line B extends from axis 86 to the centerpoint 104c of an intermediate section 104, and line C extends from axis 86 to a centerpoint 106c of an end section 106. Angle $α_A$ represents the tilt angle of the center section 102; angle $α_B$ represents the tilt angle of the intermediate section 104; and angle $α_C$ represents the tilt angle of the end section 106. As can be seen, because intermediate sections 104 are disposed toward the middle of facet 92, and are therefore closest to being directly above axis 86, the tilt angle $α_B$ of the intermediate sections 104 are relatively low, and advantageously approximately zero. In contrast, the tilt angles of the center section 102 $α_A$ and the end section 106s $α_C$ are relatively larger. As also can be seen in FIG. 6, Line A forms a forward angle relative line B, while line C forms a rearward angle relative to line B.

One parameter that helps describe the geometry of a section of the blade profile is the tilt-angle-weighted surface area of the section. Generically, the tilt-angle-weighted surface area of a blade section is the integral of the incremental surface area times the absolute value of the tilt angle α of the incremental segment, integrated across the section's longitudinal length. For the blades of FIG. 5, the tilt angle for a given section is constant across the longitudinal extent of the section. Thus, the tilt-angle-weighted surface area is simply the forward facing surface area of the section multiplied times the absolute value of the relevant tilt angle α. Thus, for the blades of FIG. 5, the intermediate sections 104 have a tilt-angle-weighted surface area that is relatively small, because the tilt angles $α_B$ of these sections 104 are very small. Indeed, if the intermediate sections 104 are disposed exactly in the middle of facet 92, then their tilt-angle-weighted surface areas would be approximately zero. In contrast, the tilt-angle-weighted surface area of end section 106 is substantially larger than the neighboring intermediate section 104 due to the significantly larger absolute tilt angle $α_C$ and approximately equal surface areas. However, the tilt-angle-weighted surface area of the end section 106 is smaller than the tilt-angle-weighted surface area of the center section 102 because center section 102 has more surface area (e.g., is longitudinally longer), but approximately equal absolute value of tilt angle α.

Figure 7:
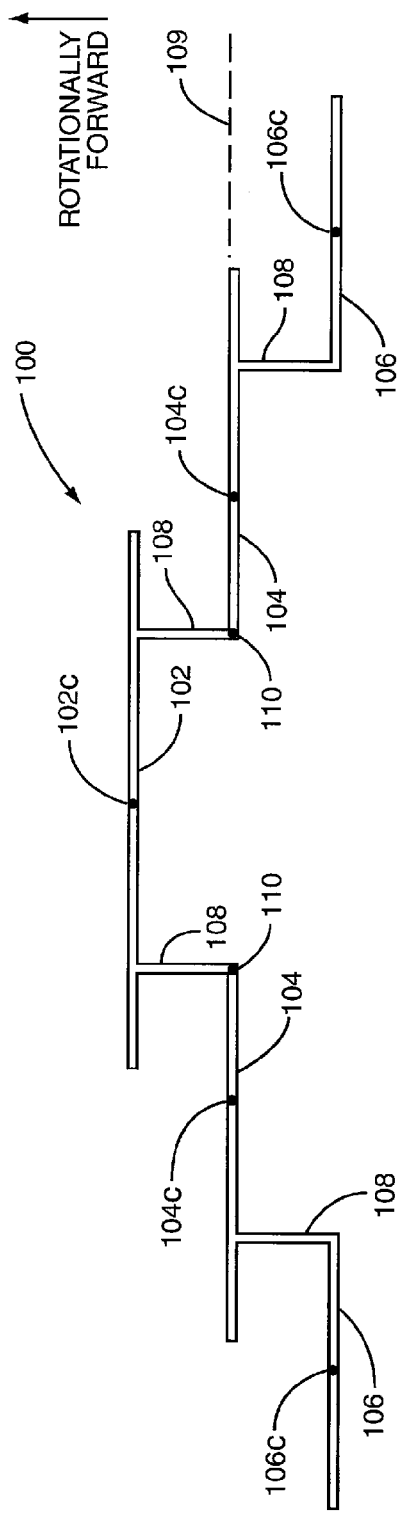
FIG. 7 shows a top (radial) view of an alternate blade profile.

The blade sections 102,104,106 for the embodiment of FIG. 7 are likewise generally straight and flat and disposed so as to extend outwardly generally perpendicular from the corresponding facet 92. The blade profile shown in FIG. 7 differs from that of FIG. 5 primarily in that the center section 102 and the intermediate sections 104 overhang a short distance from the point of intersection with the offset section 108 connecting to the next outward section. Like for the blades of FIG. 5, the calculation of the tilt-angle-weighted surface area for each section of the blades 100 in FIG. 7 is straightforward.

Figure 8:
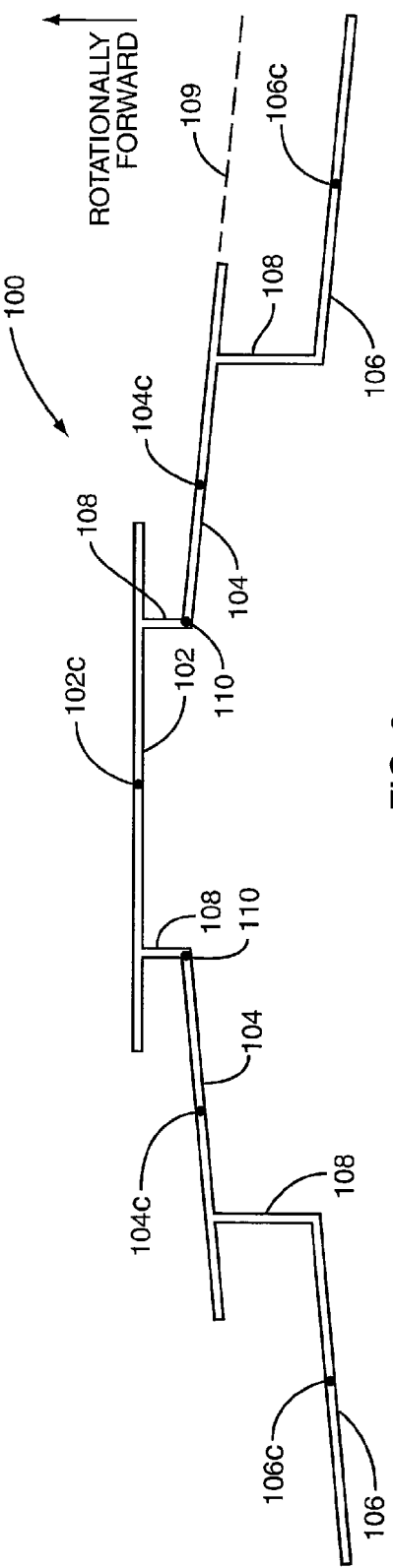
FIG. 8 shows a top (radial) view of an alternate blade profile.

The blade sections for the embodiment of FIG. 8 are likewise generally straight and flat, but the intermediate sections 104 and the end sections 106 disposed so as to extend outwardly at a rearward angle relative to the center section 102. Because the intermediate sections 104 and end sections 106 are both angled and offset, a theoretical line from centerpoint 106c of end section 106 to the centerpoint 102c of center section 102 does not pass through the centerpoint 104c of intermediate section 104. The calculation of the tilt-angle-weighted surface area for center section 102 remains straightforward. The calculation of the tilt-angle-weighted surface areas for intermediate sections 104 and end sections 106 are more complex, but it remains true that the value for tilt-angle-weighted surface area of end section 106 is substantially larger than that for the neighboring intermediate section 104.

The stepped blade profile shown in FIGS. 5, 7, and 8 results in the blade 100 having an blade axial tilt angle α that varies discontinuously across the width W of the core 90. That is, moving across the width W of the core 90 (parallel to axis 86) the blade axial tilt angle α jumps from one value to another in discontinuous fashion when moving from one blade section to another. In addition, it should be noted that the end sections 106 are not simply co-linear extensions of the intermediate sections 104. Instead, the centerpoint 106c of end section 106 is disposed off a theoretical line connecting the centerpoint 104c of intermediate section 104 and a point 110 on the intermediate section 104 closest to center section 102. Further, the blade profiles of FIGS. 5, 7, and 8 can be seen to have a greater portion of the blade 100 disposed toward the forward and rearward portions of facet 92. Thus, there is proportionally a greater amount of blade surface area located at high tilt-angle positions than in the blade designs shown in U.S. Pat. No. 6,811,020.

Figure 2:
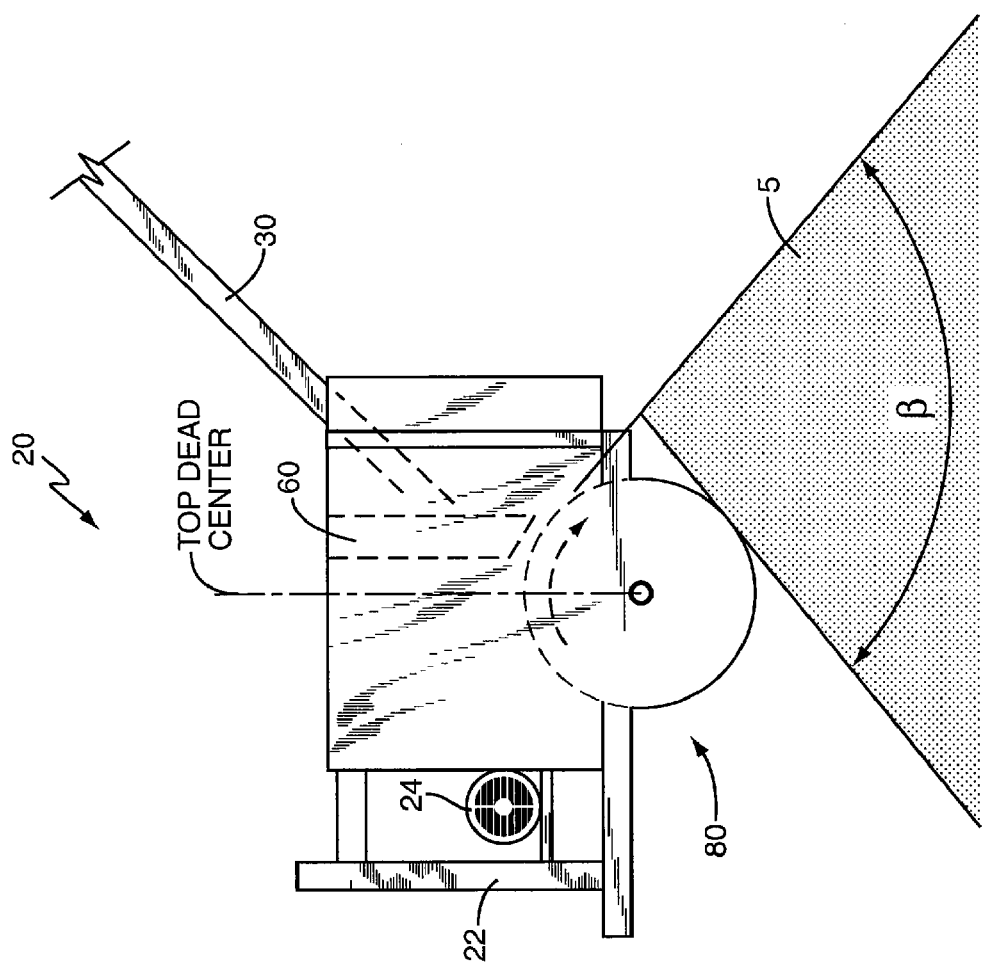
FIG. 2 shows a side view of one embodiment of the device of the present invention.

Increasing the relative percent of high tilt-angle positions (either positive or negative) for a blade profile is believed to increase the ability of the blade 100 to spread the output pattern 210 at a given drum rotational speed. Referring to FIG. 2, the angular arc β of the output pattern 210 may be increased by having greater tilt-angle-weighted surface area. Thus, for a given desired output pattern angular arc β, the rotational speed of the drum 80 may be lessened than with the design of the '020 patent. The lower rotational speed means that the wood chips 5 being flung from the drum 80 have less kinetic energy, which in turn means a reduction in undesirable splatter.

While the discussion above has been in terms of the blade's forward face being divided into five sections, one center 102, two intermediate 104, and two end 106, this is not required, and it should be understood that the blade's forward face may be divided into more three or more sections, some of which may be rearwardly angled and others of which may not, and such configurations are intended to be within the scope of the present invention. It is believed advantageous if the blade is symmetric; thus, blade section counts of three, five, seven, and the like are believed advantageous. Further, it should be noted that, within the context of the present invention, the sections may have a curving profile (longitudinally and/or radially) if desired.

Figure 9:
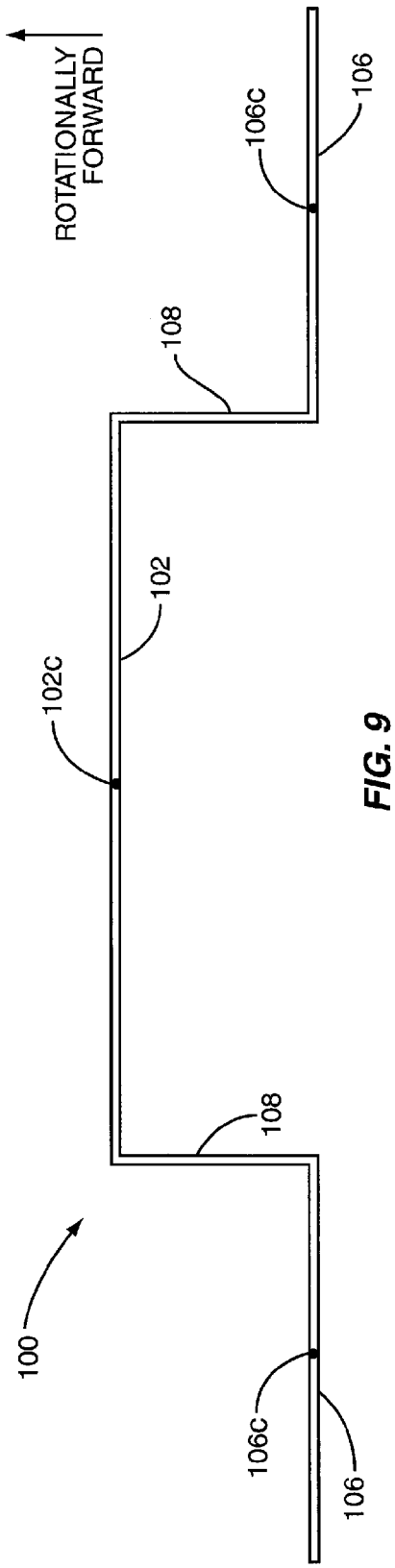
FIG. 9 shows a top (radial) view of an alternate blade profile.
Figure 10:
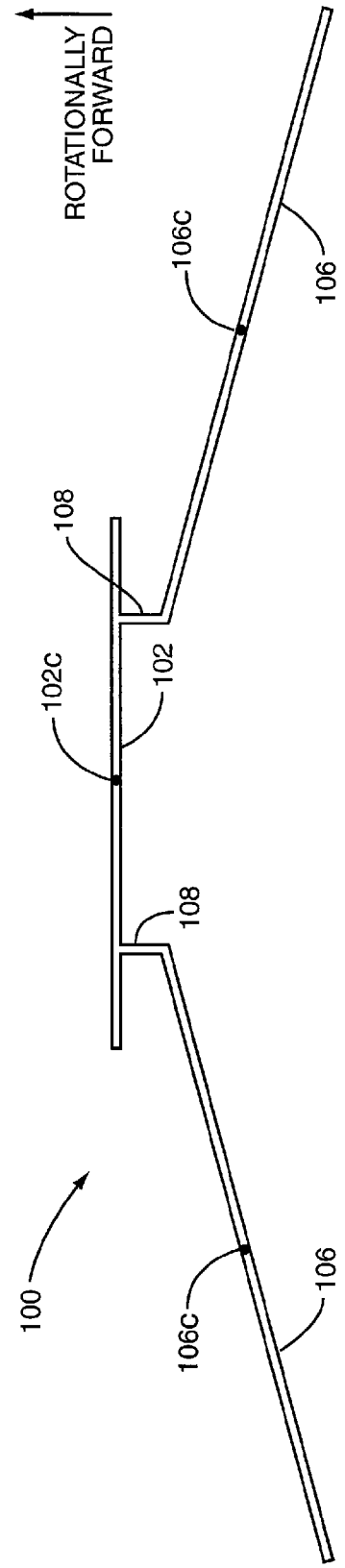
FIG. 10 shows a top (radial) view of an alternate blade profile.

One example of an alternative blade profile is shown in FIG. 9. In this profile, the blade 100 has a center section 102 and respective end sections 106, without intervening intermediate sections 104. Thus, the stepped blade profile of FIG. 9 represents a simplified version of the blade profile shown in FIG. 5, with the rotationally forward face of this blade profile formed of two end sections 106 and a center section 102. As with the blade profile of FIG. 5, the center section 102 and end sections 106 of the blade profile of FIG. 9 are advantageously positioned at the juncture of adjoining facets 92. Another example of an alternative blade stepped profile is shown in FIG. 10. This profile is similar to that of FIG. 9, but with the end sections 106 being rearwardly angled relative to center section 102, rather than parallel thereto. As above, the center section 102 is advantageously positioned at the juncture of adjoining facets 92 for this profile.

Figure 11:
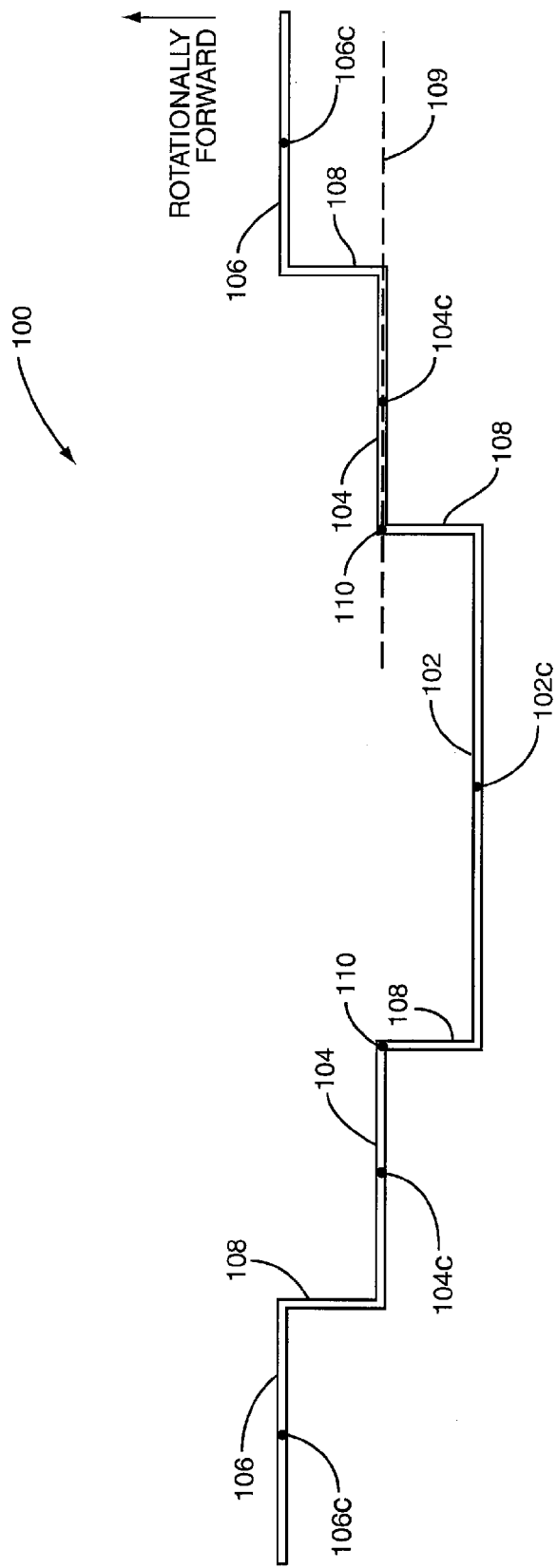
FIG. 11 shows a top (radial) view of an alternate blade profile.

The discussion above has been in terms of the center section 102 being rotationally forward. While this arrangement is believed to be advantageous, it is not required. Indeed, the stepped blade profile of FIG. 11, which is essentially an inversion of the blade profile of FIG. 5 has the center section 102 positioned rotationally rearward relative to the end sections 106. Of course, other blade profiles may be likewise inverted. However, blade profiles with center sections 102 disposed rotationally forward are believed to be advantageous because the center section 102 for blades of such configurations fling chips forward, which is believed to be more appropriate for most situations.

Each of the blade profiles discussed herein is considered to be a stepped blade profile with at least one section of the profile being disposed parallel to the drum's longitudinal axis 86. A stepped blade profile has a rotationally forward face formed of adjacent sections that are non-collinear, with joining sections (disposed generally transverse to axis 86) connecting the neighboring sections of the forward face. Typically, the neighboring sections are offset from each other in the rotational direction. Further, the stepped profiles typically have at least two of the sections disposed parallel to one another (sometimes collinear), but this is not required as seen in FIG. 10. In contrast, the blade profiles shown in FIG. 4 of U.S. Pat. No. 6,811,120, and FIG. 3 and FIG. 4 of U.S. Pat. No. 6,948,610, are not considered to be stepped, as that term is used herein.

The handling device 20 may be used to load wood chips, and particularly uniformly-sized paper making wood chips, into a pile, either on the ground or in a suitable container. Representative examples of suitable containers include railcars 12, ships, barges, trailers, storage bins, and process containers such as digestion chambers. Using a railcar 12 as an illustrative example of a container, the device 20 is mounted to the tower 16 of the loading station 10. The railcar 12 is positioned below the handling device 20, and motor 24 is started to start the drum 80 rotating. Before feeding wood chips to the device 20, the drum 80 should be rotating at a rate of approximately 50 rpm. When the drum 80 is spinning properly, wood chips supplied to the feed chute assembly 30 by the conveyor system 14, falling as an input stream 200 to the drum 80. The wood chips fall to the drum 80 and are then flung by the blades 100 of the spinning drum 80. This relatively slow initial spin rate helps prevent the wood chips leaving the drum 80 from being flung into the space between railcars. The drum rotational speed is then increased to an higher level less than 350 rpm, such as approximately 120-180 rpm. The output stream of wood chips leaving the drum 80, when the drum 80 has the blades 100 as described above, flows both forward and rearward from the drum 80. Indeed, the output stream covers an arc β of typically 90°-120°, with the arc β measured at the intersection of two lines: a line tangent to the drum where the forwardmost-flung chip leaves the drum 80 and a line tangent to the drum where the rearmost-flung chip leaves the drum 80. See FIG. 2. When viewed from above, the output pattern of the wood chips advantageously has a generally rectangular or oval shape, with perhaps a slight variation towards the middle. The wood chips flung from the drum 80 are captured by, and form a pile in, the container 12.

Even with a generally rectangular or oval output pattern, there may be an undesirable side-to-side distribution of the wood chips within the output pattern. For instance, the distribution of wood chips in the output pattern to the middle subsector, right side subsector, and left side subsector may be uneven and/or otherwise undesirable for some reason (e.g., output shifted left of center, leaving right side subsector relatively unfilled). If the optional variably positioned dividers 46 are employed, then the ratio of output flow to the various subsectors may be adjusted by the operator during operation (via adjusting mechanism 48) to reach the desired ratios. Adjustments can also be made to the drum 80 rotational speed and to the wood chip supply rate from the conveyor system 14.

In the discussion above, it has been assumed that the position of the directing wall 60 relative to drum 80 is either permanently fixed or may be varied during non-operational periods. That is, the directing wall 60 may be moved from one position to another with the drum 80 not rotating, fixed in the new position, and then the drum 80 activated. Such an arrangement is believed suitable for most applications. However, in some embodiments, the directing wall 60 may be dynamically adjusted during operation of the device 20. For example, the side sections 64 of directing wall 60 may be pivotally mounted at their upper portions to the center section 62, making their lower portions moveable relative to the center section 62. The movement of the lower portions could then be controlled by suitable actuators, such as linear drives, spring/cables, auxiliary motors, or other known actuators. The lower portions may then be moved during operation of the device 20 so as adjust the output pattern. It is believed that movement of the directing wall sections closer to top dead center will have the effect of moving rotating the output pattern generated by those sections counter-clockwise (assuming that the drum is rotating clockwise), and that movement of the directing wall sections away from top dead center will have the opposite effect.

While the exact principles are not fully understood, the handling device 20 of the present invention is able to pack wood chips at density substantially higher than so-called free-fall loading. In free-fall loading, the wood chips from the conveyor system 14 are directed to a pile, in a container or otherwise, via a simple chute system. Examination of free-fall loaded wood chips "packed" in the pile show that they land with widely varying orientations, sometimes referred to as "jack strawed" (like unstacked firewood), resulting in non-optimum density. In contrast, the wood chips loaded via the present device 20 land with a substantially consistent orientation, resulting in increased density.

The actual packed density achieved is expected to vary depending on variations in size and moisture content of the wood chips, and possibly on rotational speed of the drum 80. However, a simple ratio, referred to herein as the packing density factor, can be used to quantify the improvement provided by the present invention. The packing density factor is simply the ratio of the weight of wood chips in a given volume when packed with the test device 20 divided by to the weight of the same volume of the same type wood chips (i.e., same size and moisture content), packed using the free-fall method. For instance, it is expected that a common 7100 $ft^3$ railcar loaded with wood chips using the free fall method will have approximately seventy-seven tons of wood chips. It is expected that if the same type wood chips are loaded using the device 20 of the present invention, the 7100 $ft^3$ railcar could hold approximately one hundred tons of wood chips. Using these values, the packing density factor for the present invention would be 100/77=1.30. Clearly, substantial improvements in packing may be achieved using the present device 20, with resulting packing density factors in the range of 1.20 to 1.35 or higher. For reference, these type of packing density factors typically correspond to densities of 26.0 pounds/$ft^3$ to 29.3 pounds/$ft^3$ or more.

It should also be noted that most prior art devices which rely on a distribution device that spins about a generally vertical axis (e.g., of the type shown in U.S. Patent Publication Number 2002/0076308) tend to create round output patterns covering substantially a full 360°, which are ill suited to filling rectangular containers. As the majority of wood chips shipped between domestic locations are shipped by rail, using rectangular railcars 12, the preferred embodiments of the present invention are more suited to the needs of the industry.

The densely packed output from the flinger 20 is useful in densely packing wood chips in a variety of containers, and even for stacking wood chips on the ground. For example, many wood pulp mills receive wood chips generated at other locations and then store the wood chips as inventory for subsequently making wood pulp. It is common for this "inventory" of wood chips to be stored in a pile on the ground, such as on rough cleared land or on a concrete pad. In the prior art, this inventory pile is typically formed by the wood chips falling off the distal moving end of an inclined boom, with the wood chips routed thereto by a conveyor that runs along the boom. The booms may be track-guided linear motion booms, or may be rotating type booms. In the former case, the resulting pile of wood chips is typically an elongated mound; in the later case, the resulting pile of wood chips has an arc or annular shape when viewed from above, as dictated by the rotating boom. In both cases, the resulting pile is rather loosely packed, as it is formed by a free-fall process, with densities generally in the range of 19-23pounds/$ft^3$. The flinger 20 of the present invention may be used in such situations to allow more chips to be stored in the same space, by packing the chips with significantly higher density compared to the conventional free-fall technique, typically on the order of 25-30 pounds/$ft^3$. Thus, the pile may be said to have a packing density factor of 1.20 or more, and preferably a packing density factor of 1.3 or more.

The discussion above has described a device 20 using a single rotating drum 80. In most applications, this will be sufficient. However, the present invention is not limited thereto, and devices 20 employing a plurality of drums 80 rotating about one or more generally horizontal axes 86 are intended to be encompassed by the present invention. The most likely arrangement for such a multiple drum 80 arrangement would be to have the drums 80 located coaxially, in a manner easily understood by one of ordinary skill in the art based on the teachings of the present application.

The increase in packing density readily achieved by the present invention has clear benefits to the industry. In the simplest terms, more wood chips can be packed into a smaller space, thereby lowering transportation, storage, and processing costs. Further, given the substantial increase in packing density achieved, the cost savings can be considerable.

Under some circumstances, the additional packing density provided by use of the present flinger 20 may cause certain containers to be become overweight and/or unbalanced. For instance, railcars 12 packed using the flinger device 20 may be loaded with wood chips to a weight that is more than allowed. As such, the inventor has developed a method of filling containers, such as railcars 12, using the flinger device 20 that allows for tighter control of the filling process to avoid overfilling and/or undesirable unbalanced loading. In the method, an level sensor is used to sense the current fill level of the railcar 12 at a predetermined location relative to the flinger. For example, this predetermined location may be in a location that is above the top of railcar 12, below the flinger 20, and typically straight down from the forwardmost portion of drum 80, or slightly farther forward thereof. Various type of fill sensors may be used, such as optical, mechanical, or the like. However, optical sensors, such laser or LED based optical sensors, believed to be ideally suited. When the optical sensor is either not blocked, or is only intermittently blocked, then the filling process may proceed. However, when the sensor is blocked, this indicates that the filling process has reached a desired level, and the railcar is advanced to fill another portion of the railcar or another railcar. The "cut-off" level may be set based on weight measurements on a sample car, and may change depending on the moisture content of the wood chips, etc. If desired, the railcar 12 may be further filled to the desired volume level by filling with "loose-pack" material. Further, it may be advantageous to divert the flow of chips to the flinger 20 via the "pants leg" chute system while the gap between railcars 12 is in the chip flinging zone, so as to avoid unnecessary spillage of the chips.

As will be understood by one of ordinary skill in the art, the filling process may be manually controlled by an operator. Alternatively, as suitable electronic controller, sensors, and the like may be used.

One example of the handling device 20 of the present invention may be made using a drum 80 with a diameter of approximately thirty inches, approximately 48 inches in width, and an octagonal cross-section of approximately seven inch wide facets 92. The blades 100 may be approximately six inches in height and spaced at intervals of approximately seven inches. The blade's center section 102 may be sixteen inches; the intermediate sections 104 eight inches, and the end sections 106 also eight inches, with offset sections 108 of approximate three and one-half inches. The baseplate 42 of the feed chute assembly 30 may be at a 45° angle, with the 24-30 inch high directing wall 60 positioned such that the center section 62 is approximately five inches after top dead center and the side sections 64 are approximately ten inches after top dead center, for a gap between the directing wall 60 and the baseplate 42 of approximately ten to twelve inches.

The extra length for the offset sections 66 may be two inches. The vertical gap between the drum and the directing wall may be ½ to three inches, with a smaller gap believed to be more advantageous. The pivoting divider walls 46 may be made adjustable, with a target distribution of 25%-50%-25% for feeding to the left 84, center 82, and right 84 portions of the drum 80 respectively. The directing wall 60 and feed chute assembly 30 may be formed of ¼ inch stainless steel, with the other portions of the device 20 contacting the wood chips may advantageously made from ¼ inch abrasion resistant (AR) steel, although other materials known in the art may serve equally well. The rotational speed of the drum 80 may, for example, be on the order of 120-180 rpm.

The disclosures of U.S. Pat. No. 6,811,020 and U.S. patent application Ser. Nos. 10/465,182, filed Jun. 19, 2003, and 10/678,838, filed 3 Oct. 2003, are incorporated herein by reference to the extent not inconsistent herewith.

While the invention has been illustrated and described in detail in the drawings and foregoing description, the same is to be considered as illustrative and not restrictive in character, it being understood that only some embodiments have been shown and described and that all changes and modifications that come within the meaning and equivalency range of the appended claims are intended to be embraced therein.

What is claimed is:

1. An assembly for processing wood chips, comprising:
    a drum disposed so as to rotate about a generally horizontal longitudinal axis, said drum comprising a central core and at least first and second blades extending outwardly from said core and circumferentially spaced from one another; said drum having a longitudinal length;
    a motor operatively connected to said drum and supplying rotational power thereto; and
    said first blade having a stepped blade profile with a plurality sections forming a rotationally forward face, with neighboring sections being non-collinear and at least one of said sections being disposed generally parallel to said axis.

2. The assembly of claim 1 wherein at least two of said sections are parallel.

3. The assembly of claim 1 wherein said blade profile varies discontinuously in blade axial tilt angle.

4. The assembly of claim 1 wherein said drum has a width measured in a direction parallel to said axis, and wherein said blades each extend substantially across said width of said drum.

5. The assembly of claim 1 wherein said second blade has a blade profile similar to said blade profile of said first blade.

6. The assembly of claim 1 wherein said blade profile comprises a first section having a first centerpoint, a second section having a second centerpoint, and a third section disposed having a third centerpoint; wherein said second section is disposed between said first and third sections both along said axis and rotationally.

7. The assembly of claim 6 wherein, in radial view, said third centerpoint is disposed away from a line containing said second centerpoint and the closest point of said second section to said first section.

8. The assembly of claim 6 wherein in a cross-sectional view taken perpendicular to said axis a second theoretical line extends from said axis to said second centerpoint; wherein a first theoretical line extending from said axis to said first centerpoint forms a forward angle to said second line; and wherein a third theoretical line extending from said axis to said third centerpoint forms a rearward angle to said second line.

9. The assembly of claim 6 wherein said first blade further comprises a fifth section disposed rotationally rearward and a fourth section disposed between said first and fifth sections both along said axis and rotationally.

10. The assembly of claim 9 wherein said first, third, and fifth sections are disposed substantially parallel to said axis.

11. The assembly of claim 10 wherein said second and fourth sections are non-parallel to said axis.

12. The assembly of claim 9 wherein a tilt-angle-weighted surface area of said third section plus a tilt-angle-weighted surface area of said fifth section approximately equals a tilt-angle-weighted surface area of said first section.

13. The assembly of claim 6 wherein said first section is disposed rotationally forward relative to said second section.

14. The assembly of claim 6 wherein said first blade is mounted to a first drum core facet having a forward facet joint with a relatively leading facet and a rear facet joint with a relatively trailing facet, and wherein said first centerpoint is disposed proximate said forward facet joint.

15. The assembly of claim 14 wherein said third section extends proximate said rear facet joint generally parallel to said axis.

16. The assembly of claim 1 further comprising a container for receiving said wood chips leaving said drum.

17. The assembly of claim 1:
    wherein at least two of said sections are parallel;
    wherein said drum has a width measured in a direction parallel to said axis, and wherein said blades each extend substantially across said width of said drum;
    wherein said second blade has a blade profile similar to said blade profile of said first blade;
    wherein said blade profile comprises a first section having a first centerpoint, a second section having a second centerpoint, and a third section disposed having a third centerpoint; wherein said second section is disposed between said first and third sections both along said axis and rotationally;
    wherein, in radial view, said third centerpoint is disposed away from a line containing said second centerpoint and the closest point of said second section to said first section;
    wherein said first blade further comprises a fifth section disposed rotationally rearward and a fourth section disposed between said first and fifth sections both along said axis and rotationally;
    wherein said first section is disposed rotationally forward relative to said second section; and
    wherein said first blade is mounted to a first drum core facet having a forward facet joint with a relatively leading facet and a rear facet joint with a relatively trailing facet, and wherein said first centerpoint is disposed proximate said forward facet joint.

18. The assembly of claim 17 wherein a tilt-angle-weighted surface area of said third section plus a tilt-angle-weighted surface area of said fifth section approximately equals a tilt-angle-weighted surface area of said first section.

19. An assembly for processing wood chips, comprising:
    a drum disposed so as to rotate about a generally horizontal longitudinal axis, said drum including a central core and at least first and second blades extending outwardly from said core and circumferentially spaced from one another;
    a motor operatively connected to said drum and supplying rotational power thereto;
    said first and second blades comprising respective first, second, and third sections, said first section being generally centrally disposed and having a longitudinal extent that is at least ¼ of a length of said core; said second section disposed between said first section and said third section and non-collinear with said third section; said third section having a longitudinal extent that is at least ⅛ of said length of said core;

wherein, when viewed in cross section normal to said axis:
- an average position of said second section is disposed approximately vertically aligned with said axis;
- an average position of said first section is disposed a first of rotationally forward or rotationally rearward of said axis; and
- an average position of said third section is disposed the other of rotationally forward or rotationally rearward of said axis.

20. The assembly of claim 19 wherein said average position of said first section is disposed rotationally forward of said axis.

21. The assembly of claim 19 wherein said first and second blades further comprise a fifth section and a fourth section disposed between said first and fifth sections both along said axis and rotationally; said fifth section disposed generally opposite said third section relative to said first section.

22. An assembly for processing wood chips, comprising:
- a drum disposed so as to rotate about a generally horizontal longitudinal axis, said drum including a central core and at least first and second blades extending outwardly from said core in spaced relation to each other;
- a motor operatively connected to said drum and supplying rotational power thereto;
- said first and second blades having respective first, second, and third sections, said first section being generally centrally disposed relative to a longitudinal length of said core, said second section disposed longitudinally between said first section and said third section;
- said second and third sections having approximately equal longitudinal extents relative to said axis;
- wherein a second tilt-angle-weighted surface area of said second section is substantially less than a third tilt-angle-weighted surface area of said third section.

23. The assembly of claim 22 wherein said second tilt-angle-weighted surface area is substantially less than a first tilt-angle-weighted surface area of said first section.

24. The assembly of claim 23 wherein said first tilt-angle-weighted surface area is larger than said third tilt-angle-weighted surface area.

* * * * *